United States Patent
Dölger et al.

(10) Patent No.: US 7,467,515 B2
(45) Date of Patent: Dec. 23, 2008

(54) HYDROSTATIC DRIVE SYSTEM

(75) Inventors: Marcus Dölger, Haibach (DE); Henning Lobb-Rabe, Obertshausen (DE)

(73) Assignee: Linde Material Handling GmbH, Aschaffenburg (DE)

( * ) Notice: Subject to any disclaimer, the term of this patent is extended or adjusted under 35 U.S.C. 154(b) by 127 days.

(21) Appl. No.: 11/594,037

(22) Filed: Nov. 7, 2006

(65) Prior Publication Data
US 2007/0119162 A1    May 31, 2007

(30) Foreign Application Priority Data
Nov. 8, 2005    (DE) ........................ 10 2005 053 265

(51) Int. Cl.
*E02F 9/22*    (2006.01)
*F15B 11/00*    (2006.01)
(52) U.S. Cl. .......................................... 60/422; 60/466
(58) Field of Classification Search .................. 60/422, 60/466, 468
See application file for complete search history.

(56) References Cited

U.S. PATENT DOCUMENTS

| | | | | |
|---|---|---|---|---|
| 5,063,742 A | * | 11/1991 | Yoshimatsu | .................. 60/466 |
| 5,460,000 A | * | 10/1995 | Kropp | .......................... 60/422 |
| 6,295,810 B1 | * | 10/2001 | Langen et al. | ................ 60/450 |
| 6,499,296 B1 | * | 12/2002 | Weickert et al. | .............. 60/466 |
| 6,732,513 B2 | * | 5/2004 | Tajima | ......................... 60/468 |
| 6,871,494 B2 | * | 3/2005 | Kim | ............................. 60/468 |
| 7,150,150 B2 | * | 12/2006 | Bigo et al. | .................... 60/468 |

FOREIGN PATENT DOCUMENTS

EP    908653 A1 *    4/1999

* cited by examiner

*Primary Examiner*—Thomas E Lazo
(74) *Attorney, Agent, or Firm*—The Webb Law Firm

(57) ABSTRACT

A hydrostatic drive system has a consumer (7), in particular a hydraulic motor, located in the open circuit. Associated with the consumer (7) is at least one pressure limiting device (11*a*; 11*b*) that can be actuated in the braking phase for the generation of a braking pressure that is present on the discharge side of the consumer (7) from a minimum response pressure in the direction of an increase of the response pressure. A feeder device (12*a*; 12*b*) provides a feed of pressure fluid into the admission side of the consumer (7). The pressure limiting device (11*a*; 11*b*) and the feeder device (12*a*; 12*b*) are integrated into a valve unit (10*a*; 10*b*).

14 Claims, 1 Drawing Sheet

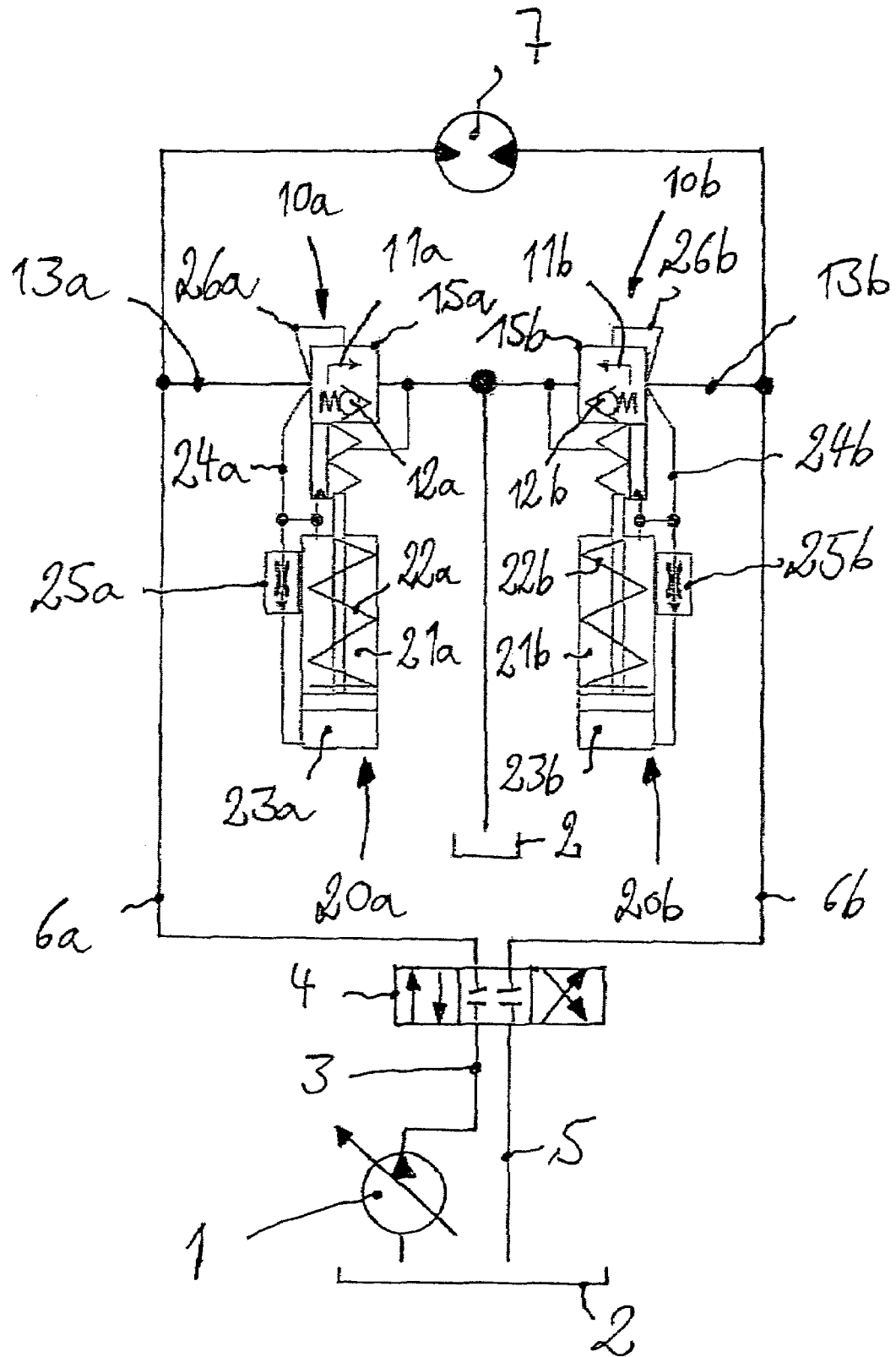

HYDROSTATIC DRIVE SYSTEM

CROSS REFERENCE TO RELATED APPLICATION

This application claims priority to German Application No. 10 2005 053 265.9, filed Nov. 8, 2005, which application is herein incorporated by reference in its entirety.

BACKGROUND OF THE INVENTION

1. Field of the Invention

This invention relates to a hydrostatic drive system with a consumer, such as a hydraulic motor, located in an open circuit. Associated with the consumer is at least one pressure limiting device that can be actuated in the braking phase for generation of a braking pressure on the discharge side of the consumer. The braking pressure can change from a minimum response pressure to an increase in the response pressure. A feeder device provides a feed of pressure fluid into the admission side of the consumer.

2. Technical Considerations

Drive systems of this type are used, for example, as slewing gear drives for mobile machines, such as excavators. To decelerate the consumer, a control valve that controls the consumer is actuated into a neutral position in which the pressure fluid lines leading to the consumer are blocked. As a result of the inertia of masses in movement of the revolving superstructure of the excavator that is driven by the slewing gear, the consumer continues to be driven during the braking phase. As a result of which, the pressure conditions at the consumer are reversed. A braking pressure then accumulates in the discharge side of the consumer, which is protected by means of a pressure limiting device.

The pressure limiting device is provided with a pressure increase circuit. During the braking phase, the pressure limiting device is pressurized within a defined length of time from a minimum response pressure to a maximum response pressure. During this pressure increase, the response pressure of the pressure limiting device therefore increases, as does the braking pressure that decelerates the consumer. The play that results from manufacturing tolerances in the gear train of mechanical gearing associated with the slewing gear drive, with a shift of the gearing at the beginning of the braking phase, is thereby passed through at the minimum response pressure. As a result of which, a smooth deceleration of the slewing gear is achieved. As a result of the ability to increase the pressure in the pressure limiting device, a smooth and gentle deceleration response of the drive system is therefore achieved.

To prevent cavitation on the admission side of the consumer during the deceleration phase, a feeder device is also required which, by means of feeder valves, makes it possible to feed pressure fluid into the admission side of the consumer from the reservoir or from the discharge side of the consumer.

However, a drive system of this type with pressure limiting devices in which the pressure can be increased and a feeder device that is formed by additional feed valves requires a great deal of construction and manufacturing effort and expense on account of the locations in which the system must be installed and the lines and conduits required for the pressure limiting devices and the feeder devices.

Therefore, it is an object of the invention to provide a hydrostatic drive system of the general type described above but that requires relatively little construction and manufacturing effort and expense.

SUMMARY OF THE INVENTION

The invention teaches that this object can be accomplished by integrating the pressure limiting device and the feeder device into one valve unit. The invention therefore teaches that the pressure limiting device in which the pressure can be increased and the feeder device are combined in a single valve unit. As a result, only one installation space is necessary for the pressure limiting device and the feeder device. A simple routing of the hydraulic lines and conduits is also achieved. Overall, therefore, a drive system of the invention can be realized with less construction effort and expense and requires less installation space.

In one advantageous embodiment of the invention, the valve unit is a combined pressure control and feeder valve. The function of the pressure limiting device in which the pressure can be increased and the function of the feeder device can, therefore, be achieved in a single valve unit, with little construction effort and expense.

In one development of the invention, to increase the response pressure, the valve unit is functionally connected with a piston device that acts to increase the response pressure of the pressure control unit. With a piston device of this type, which is in functional communication with a control surface of the pressure control valve of the valve unit that acts toward the closed position and, thus, toward an increase of the response pressure, it becomes possible to realize in a simple manner a pressure limiting device in which the pressure can be increased.

The piston device advantageously has a first control pressure chamber that actuates the valve unit in the direction of a reduction of the response pressure and is actuated by the consumer pressure, and a second control pressure chamber that actuates the valve unit toward an increase of the response pressure and is pressurized by the consumer pressure by means of a flow control device, such as a choke device. As a result, by means of the consumer pressure present on the discharge side, a controlled pressure increase of the pressure limiting device of the valve unit can be achieved, whereby the chronological progress of the pressure increase is controlled by the flow control device.

In one preferred embodiment of the invention, a spring is located in the first control pressure chamber. The spring can be used to easily specify the minimum response pressure of the pressure limiting device.

In one development of the invention, the valve unit is located in a control pressure line that leads from a pressure fluid line in communication with the consumer to a reservoir. As a result, a simple routing of the lines and conduits for the valve unit that has the pressure limiting device and the feeder device can be achieved.

The pressure limiting device can advantageously be actuated in the direction of an open position by the pressure that is present in the pressure fluid line. As a result of which, a control of the braking pressure present in the discharge side can be achieved easily.

The feeder device can be realized particularly advantageously in the form of a non-return valve, such as a spring-loaded check valve that opens toward the pressure fluid line. As a result of which, a simple construction for the feeder device can be achieved.

It is particularly advantageous if the consumer is realized in the form of a consumer that can be operated from both sides, and a valve unit is associated with each consumer side of the consumer. Only two valve units are therefore necessary to guarantee the braking pressure and to protect the admission side against cavitation of a bilaterally operable consumer. As a result of which, less space is required for the installation of the valve units and a simple routing of the valve lines and conduits can be achieved with only two valve units, with corresponding reduced construction and manufacturing effort and expense.

Particular advantages are achieved by the realization of the drive system of the invention in the form of a slewing gear drive of a piece of mobile machinery, such as an excavator. With the valve units of the invention, a smooth and recoil-less deceleration of the slewing gear and a protection of the slewing motor against cavitation can be achieved with little manufacturing effort and expense.

The drive system of the invention can also be realized in the form of a traction drive of a mobile piece of equipment, such as an excavator. As a result of which, smooth and recoil-less deceleration of the mobile machine and a protection of the traction motor against cavitation can be achieved in a simple manner.

BRIEF DESCRIPTION OF THE DRAWING

Additional advantages and details of the invention are explained in greater detail below on the basis of the exemplary embodiment that is illustrated in the accompanying schematic drawing, which is a schematic diagram of a hydrostatic drive system of the invention.

DESCRIPTION OF THE PREFERRED EMBODIMENT

The drive system has a pump 1 that is realized in the form of a variable displacement pump, for example, a controlled, load-sensing pump, which sucks pressure fluid out of a reservoir 2 and delivers it into a delivery line 3. The delivery line 3 is connected to a control valve 4, which is also connected to a reservoir line 5 that leads to the reservoir 2, and is also connected to pressure fluid lines 6a, 6b that lead to the consumer 7, such as a hydraulic motor.

Associated with each pressure fluid line 6a, 6b is a valve unit 10a, 10b of the invention. Each valve unit 10a, 10b has a pressure limiting device 11a, 11b, in which the pressure can be increased, and a feeder device 12a, 12b. The pressure limiting device 11a, 11b in this case is located in a first control pressure line 13a, 13b, which is connected to the pressure fluid line 6a, 6b and leads to the reservoir 2.

The valve unit 10a, 10b of the invention is, in this case, realized in the form of a combined pressure control and feeder valve 15a, 15b.

The pressure limiting device 11a, 11b in which the pressure can be increased has a piston device 20a, 20b which is functionally connected with a control surface that acts in the direction of a closed position and, thus, effects an increase in the response pressure of the pressure limiting device 11a, 11b of the valve unit 10a, 10b. For this purpose, the piston device 20a, 20b has a rod-side first control pressure chamber 21a, 21b that acts in the direction of a reduction of the response pressure of the pressure limiting device 11a, 11b. A spring 22a, 22b is located in the first control pressure chamber 21a, 21b and limits the minimum response pressure. A second control pressure chamber 23a, 23b on the piston-base side actuates the pressure limiting device 11a, 11b of the valve unit 10a, 10b in the direction of an increase of the response pressure. The control surface of the first control pressure chamber 21a, 21b is, in this case, smaller than the control surface of the second control pressure chamber 23a, 23b. The first control pressure chamber 21a, 21b and the second control pressure chamber 23a, 23b are pressurized by the pressure that is present in the pressure fluid line 6a, 6b. For this purpose, a second control pressure line 24a, 24b is provided, which is connected to the segment of the control pressure line 13a, 13b that is in communication with the pressure fluid line 6a, 6b, and runs to the first control pressure chamber 21a, 21b and to the second control pressure chamber 23a, 23b. Associated with the second control pressure chamber 23a, 23b is a flow control device 25a, 25b, which is located in the control pressure line 24a, 24b downstream of the connection of the first control pressure chamber 21a, 21b to the control pressure line 24a, 24b.

The pressure limiting device 11a, 11b can be actuated by means of a control pressure line 26a, 26b in the direction of the open position. The control pressure line 26a, 26b is thereby actuated by the pressure in the pressure fluid line 6a, 6b and, for this purpose, is connected to the segment of the control pressure line 13a, 13b that is in communication with the pressure fluid line 6a, 6b.

The feeder device 12a, 12b is realized in the form of a non-return valve, for example in the form of a spring-loaded check valve that opens in the direction of the pressure fluid line 6a, 6b.

To decelerate the consumer 7, the control valve 4 is actuated into the neutral position in which the pressure fluid lines 6a, 6b are blocked. In the discharge-side pressure fluid line 6a or 6b, a braking pressure builds up which is protected by the pressure limiting device 11a or 11b, respectively, of the valve unit 10a or 10b associated with the discharge-side pressure fluid line 6a or 6b, respectively. For this purpose, the pressure limiting device 11a or 11b is set to a minimum protection pressure at the beginning of the braking phase. The braking pressure that results, via the control pressure line 24a or 24b and the flow control device 25a or 25b, pressurizes the second control pressure chamber 23a or 23b of the piston device 20a, 20b. As a result of which, the pressure limiting device 11a or 11b is actuated in the direction of an increase of the protection pressure and, thus, of an increase of the braking pressure. This increase in the response pressure of the pressure limiting device 11a or 11b in the braking phase is timed and controlled by the flow control device 25a or 25b.

By means of the feeder device 12b or 12a of the valve unit 10b or 10a that is associated with the admission-side pressure fluid line 6b or 6a, respectively, it becomes possible during the braking phase to feed pressure fluid into the admission-side pressure fluid line 6a, 6b from the reservoir 2 or via the open pressure limiting device 11a or 11b of the valve unit 10a or 10b that is associated with the discharge-side pressure fluid line from the discharge-side pressure fluid line 6a or 6b.

As a result of the integration of the pressure limiting device 11a, 11b and the feeder device 12a, 12b into a single valve unit 10a, 10b, and the realization of the valve unit 10a, 10b in the form of a combined pressure control and feeder valve 15a, 15b, only one valve unit 10a, 10b is thereby necessary for the protection of each side of the consumer 7. Compared to drive systems of the known art, in which a pressure limiting device and a separate feeder device must be associated with each side of the consumer, the space for one of those installations is no longer needed, and the routing of the hydraulic lines and conduits can be simplified. This, in turn, results in reduced construction effort and expense and decreased space requirements for the drive system of the invention.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydrostatic drive system, comprising:
   a consumer located in an open circuit;
   at least one pressure limiting device which can be actuated in a braking phase for generation of a braking pressure on a discharge side of the consumer from a minimum response pressure in a direction of an increase of the response pressure; and
   a feeder device to provide a feed of pressure fluid into an admission side of the consumer,
   wherein the pressure limiting device and the feeder device are integrated into a valve unit,
   wherein for the increase of the response pressure, the valve unit is in functional communication with a piston device that acts in the direction of an increase of the response pressure of the pressure limiting device, and
   wherein the piston device has a first control pressure chamber that actuates the valve unit in the direction of a reduction of the response pressure and is pressurized by the consumer pressure, and the piston device has a second control pressure chamber that actuates the valve unit in the direction of an increase of the response pressure and is pressurized by the consumer pressure by a flow control device.

2. The hydrostatic drive system as claimed in claim 1, wherein the valve unit is a combined pressure limiting and feeder valve.

3. The hydrostatic drive system as claimed in claim 1, including a spring located in the first control pressure chamber.

4. The hydrostatic drive system as claimed in claim 1, wherein the valve unit is located in a control pressure line that runs from a pressure fluid line in communication with the consumer to a reservoir.

5. The hydrostatic drive system as claimed in claim 4, wherein the pressure limiting device is actuated by the pressure in the pressure fluid line in the direction of an open position.

6. The hydrostatic drive system as claimed in claim 4, wherein the feeder device is a non-return valve that opens in the direction of the pressure fluid line.

7. The hydrostatic drive system as claimed in claim 6, wherein the non-return valve is a spring-loaded check valve.

8. The hydrostatic drive system as claimed in claim 1, wherein the consumer is a bilaterally operable consumer, with a valve unit associated with each side of the consumer.

9. The hydrostatic drive system as claimed in claim 1, wherein the drive system is a slewing gear drive of a mobile machine.

10. The hydrostatic drive system as claimed in claim 9, wherein the mobile machine is an excavator.

11. The hydrostatic drive system as claimed in claim 1, wherein the drive system is a traction drive of a mobile machine.

12. The hydrostatic drive system as claimed in claim 11, wherein the mobile machine is an excavator.

13. The hydrostatic drive system as claimed in claim 1, wherein the consumer is a hydraulic motor.

14. The hydrostatic drive system as claimed in claim 1, wherein the flow control device is a choke device.

* * * * *